INVENTOR
Gerhard Dirks
BY
Michael J. Striker
ATTORNEY

INVENTOR
Gerhard Dirks
BY
Michael J. Striker
ATTORNEY

INVENTOR
Gerhard Dirks

BY

Michael J. Striker
ATTORNEY

INVENTOR
Gerhard Dirks
BY
Michael J. Striker
ATTORNEY

United States Patent Office 3,448,214

Patented June 3, 1969

3,448,214

STORAGE DEVICE

Gerhard Dirks, 12120 Edgecliff Place, Los Altos Hills, Calif. 94022

Original application Oct. 27, 1960, Ser. No. 65,440, now Patent No. 3,205,483, dated Sept. 7, 1965. Divided and this application Aug. 24, 1965, Ser. No. 482,075
Claims priority, application Great Britain, June 23, 1950, 15,773/50; Dec. 23, 1954, 37,208/54; Germany, Oct. 1, 1948, D 11,464
Int. Cl. H04l *15/18, 15/12, 15/24*
U.S. Cl. 178—17.5 14 Claims

ABSTRACT OF THE DISCLOSURE

A control and operating means for printing, indicating and other representation of data, comprising input means, storage means, including a plurality of groups of conductors and storage elements, energizing means, including switching means and output means. This arrangement also includes actuating means for making the output elements selectively operative.

The present application is a division of my application Ser. No. 65,440, filed Oct. 27, 1960, entitled "Matrix Device," now U.S. Patent No. 3,205,483, which application Ser. No. 65,440, in turn, is a division of my application Ser. No. 498,041, filed on Mar. 30, 1955, and entitled, "Teletyping and other Information," now U.S. Patent No. 2,972,016, which application Ser. No. 498,041, in turn, is a continuation-in-part of my application Ser. No. 101,032, filed on June 24, 1949, entitled "Electronic Office Machine With Computing-, Indicating, Printing-, Storing- and Sorting Mechanisms," and now abandoned.

The present invention relates to a means for the transmission of signals representing characters to be printed or typed or fed to some other devices and consisting essentially of a method and means for converting input signals in serial order to output signals in parallel order so that each character may be printed or typed as a whole even if the original singals represent parts of the character in a predetermined sequence.

The arrangement of the present invention is useful in making visible the result of a computation performed by an electronic digital computer at a high speed. The invention may be used with the computer disclosed in my copending patent application, Ser. No. 432,093, filed May 25, 1954 now abandoned.

The invention provides a method of printing or other indication of characters wherein signal sequences representing parts of said characters are fed by a distributor into corresponding parts of a non-mechanical storage device, and are subsequently fed simultnaeously from the parts of such storage device to printing or other indicating means.

The present invention is described as applied to a multi-denomination line at a time high speed printer as an example. It is evident that it can be used also with a printer for one or a few demonstrations and printing on the dot or line principle or otherwise.

One of the main features of the operation of the invention is the use of an electronic distributor with electronic synchronizing means, and, in the case of a teletypewritter, the use of such distributor and synchronizer both at the transmitting and receiving ends. The distributors are preferably cathode ray distributors, the cathode ray of which is deflected in dependence on synchronizing signals on the same signal carrier as the character-representing signals.

Another feature of the invention is the use of storage means, especially those of the magnetic types, either on the transmitter or receiver side, to increase the output of the arrangements.

Figure 1:
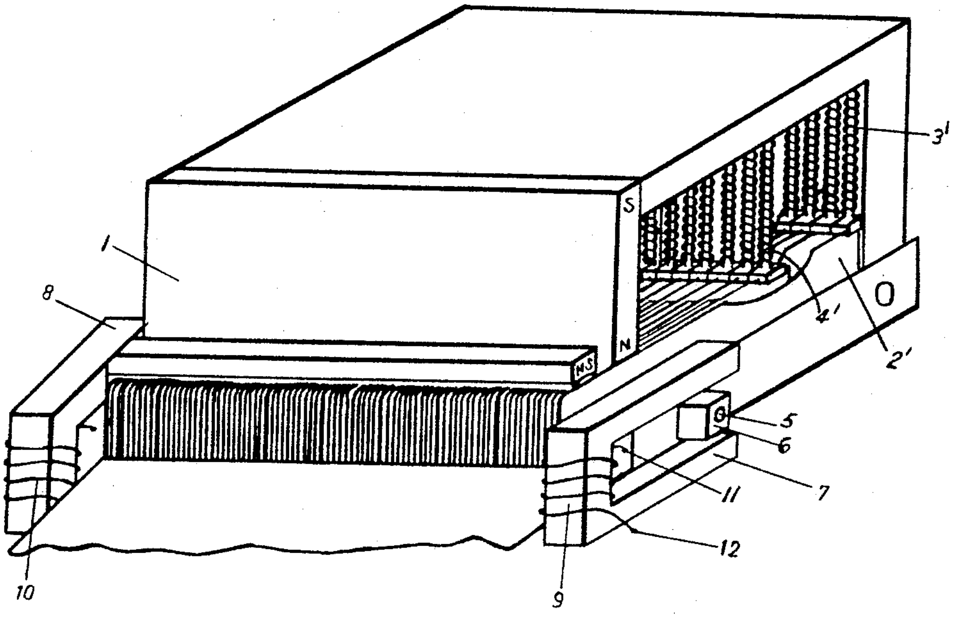
Figure 2:
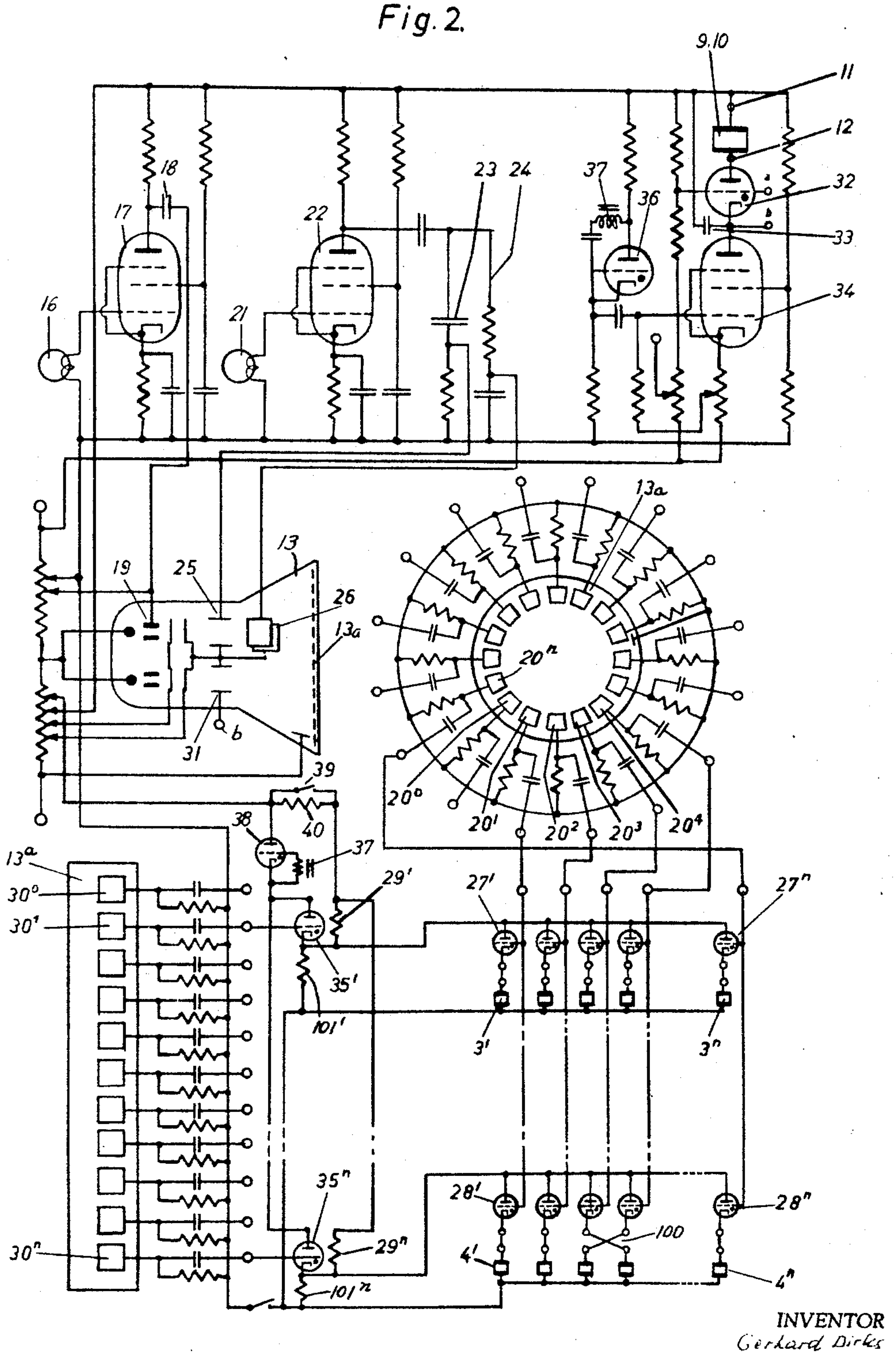
Figure 3A:
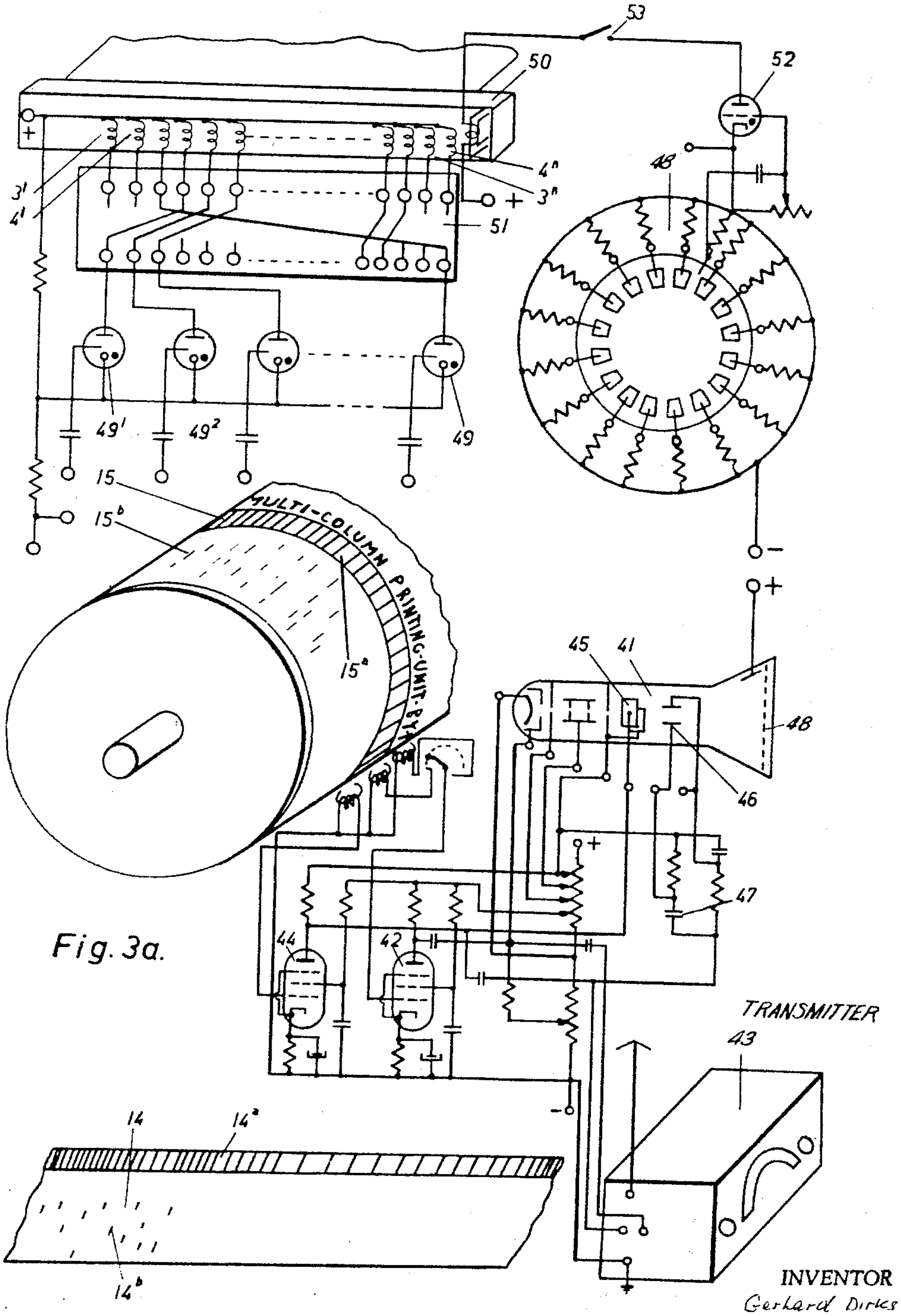
Figure 3B:
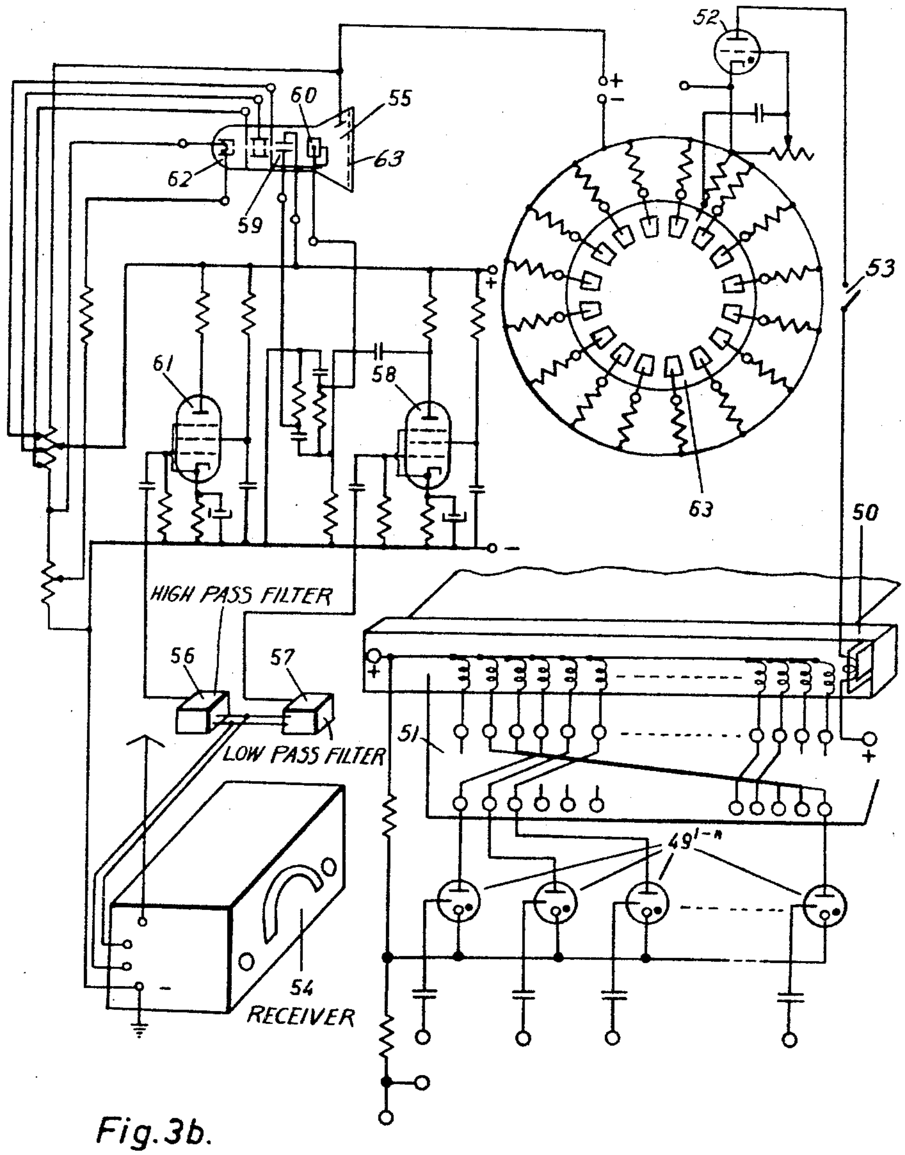

In order that the invention may be readily carried into effect, it will now be described with reference to the accompanying drawing, wherein:

FIG. 1 is a perspective view of an embodiment of a multi-denomination printer for high speed printing according to the dot or line-wise principle and adapted to print in different denominations simultaneously. Such a printer is described in my copending patent application, Ser. No. 432,297, filed May 25, 1954 now abandoned;

FIG. 2 is a schematic circuit diagram of an embodiment of an electronic synchronizing and distributing means for the control of a multi-denomination printing device of the type shown in FIG. 1; and FIGS. 3*a* and 3*b* are schematic circuit diagrams of embodiments of a transmitting station and a receiving station, with a dot-wise operating multi-denomination printer, coordinated electronic synchronizing means in the form of cathode ray distributors, and alternative magnetic storage means in the form of a magnetizable drum and a magnetizable tape on the transmitting side (FIG. 3*a*).

As stated, the invention is illustrated as applied to a printing device such as described in my copending patent application, Ser. No. 432,297, filed May 25, 1954, now abandoned, in which characters are made up of dots and/or lines in rows, the rows usually running transversely across the characters so that, with a series of side by side characters, the said transverse rows extend through all the characters, and the complete sequence of characters can be printed by the simultaneous printing of the several rows of dots and/or lines.

The invention is equally applicable to other indications of characters, such as, for example the visual indication means disclosed in my copending patent application, Ser. No. 432,298, filed May 25, 1954 now abandoned.

As shown in FIG. 1, a permanent magnet 1 has its magnetic circuit completed via parts of the separate printing levers $2^{1-n}$ and the cores of the coils $3^{1-n}$ and $4^{1-n}$, these being arranged one behind the other as explained in the said copending patent application, Ser. No. 432,297, filed May 25, 1954 now abandoned. The main shaft 5 is moved up and down by the polarized magnetized elements 6 moving between the poles of magnets 7 and 8, which are energized by an alternating current or a current controlled by electronic tubes or by contacts and flowing through the coils 9 and 10 of the magnets 7 and 8; the coil 9 having terminals 11 and 12. By energizing of the magnet coils $3^{1-n}$, $4^{1-n}$ and so on, in a selective sequence depending on the sequences of parts of characters in the transverse rows of the characters which are to be printed, the printing of the different rows, collectively forming the shapes of the different characters, can be effected at high speeds. The speed is limited by the frequency which can be reached by pivoted levers controlled by magnet coils. Under the more difficult conditions of the usual relays, involving inductive and mechanical inertia, an armature frequency of 250 cycles per second in the printing devices is easily reached. The present construction reduces the restrictive effect of the inductive and mechanical inertia of the mechanism, and makes possible the printing of at least 250 dot lines per second, equalling 25 type character lines per second as a maximum speed. This output corresponds to 90,000 type character lines per hour, or in a multi-column printing unit of 100 denominations, a working limit of 250 type characters per second.

The control of the energization of the printing magnet coils is effected in the example shown by the cathode ray distributor 13 of FIG. 2. The use of this relatively simple and inexpensive delay-less distributor is preferred for the present mode of high speed printing and teleprinting because it provides easy synchronization. Of course, inductive distributors or other electronic or electric distributing means may be used for the same purpose.

The printing arrangement of FIG. 1 and the cathode ray distributor of FIG. 2 operate together in the following way. The magnetic tape 14 (FIG. 3*a*) and the magnetic storage drum 15 (FIG. 3*a*) contain synchronizing signals or frequencies at **14*a*, 15*a*, respectively, in addition to the signals at 14*b*, 15*b* respectively representing the different type characters to be printed. In order to print the type characters by dots or lines when they are initially represented by signals in a different code, such other signal code must be converted to a suitable code for the dot and line system of character representation. In such a case the selective storage 15** of FIG. 3*a* will be used as a converter.

In the wiring diagram of FIG. 2 the pulse sequences representing the dots or lines in the top line of the row of side-by-side type characters, which is the first row to be printed, will be sensed in sequence by a magnetic sensing head 16, one end of the winding of which is connected to the control grid of the amplifier pentode 17. The consequent variations of the plate voltage of this pentode 17 are transferred via the capacitor 18 to the negatively biased control electrode 19 associated with one deflecting system of the double deflecting systems of the cathode ray tube 13.

The synchronization of the rotation of the cathode ray beam over the sectors $\mathbf{20}^{0-n}$ on the screen **13*a* with the movement of the storage device 14 or 15 is described in my copending patent applications, Ser. Nos. 498,047 and 498,048 and is effected by means of the sensing head 21, the gap of which lies opposite the sine wave synchronization signals (14*a*, 15*a*) of the storage device. One end of the coil of this sensing head 21 is connected to the control grid of pentode 22. After amplification this synchronization frequency is applied to a phase-shifting device consisting of a bridge 23, 24**. One pair of opposite arms of the bridge are resistive and the other pair of arms are capacitive. The values of the bridge arms are such that the sine waves at the two output junctions of the bridges have a phase difference of 90°.

The output junctions of the bridge are connected to the deflecting plate systems 25 and 26, forming part of the upper electrode system of the cathode ray tube.

The negative bias of the control electrode 19 of the upper electrode system of the cathode ray tube is such that the intensity of the cathode ray beam passing over the secondary electron emitting sectors $\mathbf{20}^{1-n}$ of the screen **13*a* does not normally release a sufficient quantity of secondary electrons to produce an appreciable signal on the control grids of the thyratrons $\mathbf{27}^{1-n}$ and $\mathbf{28}^{1-n}$, and so on, if no pulse is sensed by head 16 and amplified by pentode 17. If such a pulse is sensed the control electrode 19 becomes less negative for the duration of this pulse, a positive pulse being applied to the electrode 19 via the capacitor 18, connected to the plate of pentode 17, and the intensity of the cathode ray beam is increased sufficiently for the corresponding sector on which the beam is then impinging to release secondary electrons in sufficient quantities to ignite the gas discharge tubes 27, 28**, and so on.

In the main discharge circuit of these discharge tubes are connected the control electromagnets $\mathbf{3}^{1-n}$, $\mathbf{4}^{1-n}$ of the printing unit. These are interconnected in any selected way, by manually pluggable connections 100.

The energization of the electromagnets 7 and 8 is controlled by the discharge tube 32, in the main discharge circuit of which the coils 9 and 10 of these electromagnets are connected. If no more than about 100 to 200 coils are to be energized, the control of the control grid of the discharge tube 32 can be effected by pulses taken directly from the secondary emitting line $\mathbf{20}^{0}$ which pulses occur once for each rotation of the cathode ray on the screen **13*a***.

With such a number of coils $\mathbf{3}^{1-n}$, $\mathbf{4}^{1-n}$, and corresponding sectors on the screen **13*a***, a single cathode ray tube distributor can be used. With greater numbers of coils and sectors a plurality of cathode ray tubes would be used, operating in series.

In order that the cathode ray distributor may be used repeatedly within one complete printing cycle the second deflecting system of the cathode ray distributor operates one after another a series of discharge tubes under control of additional sectors $\mathbf{30}^{1-n}$.

In this case, the igniting of the discharge tube 32 is effected by the top sector $\mathbf{30}^{0}$.

The deflection of the cathode ray beam of the deflecting plate system 25–31 is controlled by capacitor 23 in the plate circuit of pentode 22, one end of which capacitor is connected with one of said deflecting plates 25–31. With every cycle of the rotation of the cathode ray over secreen **13*a* a pulse is produced by sector $\mathbf{20}^{0}$, effecting the ignition of the discharge tube 36. By this means the charging pentode 34** is made conductive for a short interval, although it is normally non-conductive in consequence of a negative bias applied to the control grid via the grid-leak resistance. By this means a stepwise deflection of the cathode ray, passing over the sectors $\mathbf{30}^{0}$ to $\mathbf{30}^{n}$, is effected in such a way that during every rotation of the other beam, said cathode ray is deflected by one step.

At the first rotation, the cathode ray passing over the sectors $\mathbf{30}^{0}$ to $\mathbf{30}^{n}$, having a predetermined intensity ignites the discharge tube 32, via connection *a*, thus discharging capacitor 33. When impinging on section $\mathbf{20}^{0}$, the other cathode ray effects the ignition of the discharge tube 36 via connection *c*. Capacitor 33 is charged by one unit, as described above, thus deflecting the cathode ray by one step onto sector $\mathbf{30}^{1}$ via connection *b* and igniting the coordinated gas discharge tube $\mathbf{35}^{1}$. The gas discharge tube $\mathbf{35}^{1}$ produces across its cathode resistance $\mathbf{101}^{1}$ a plate voltage for the discharge tubes $\mathbf{27}^{1-n}$ of the upper row, which is just below the ignition voltage. Therefore, only this one of the rows is prepared to be ignited, if a pulse is applied to the control grids, connected in common to each sector $\mathbf{20}^{1}$ to $\mathbf{20}^{n}$ of the cathode ray distributor 13. Thus, only that one of the discharge tubes $\mathbf{27}^{1-n}$ can be ignited, which receives a pulse from the sectors $\mathbf{20}^{1}$ to $\mathbf{20}^{n}$ and is in the row of said discharge tubes controlled by the sectors $\mathbf{30}^{1}$ to $\mathbf{30}^{n}$ by having plate voltage applied thereto.

After one rotation of the cathode ray controlled by deflecting system 25 of the distributor the other cathode ray passes on to sector $\mathbf{30}^{2}$, as a result of igniting the discharge tube 36. Through the transformer 37 a negative pulse is applied to the grid of triode 38 to make it nonconducting and momentarily interrupt the above voltage supply to the discharge tubes $\mathbf{35}^{1-n}$. Therefore, the discharge tube $\mathbf{35}^{1}$ is extinguished, but those of the discharge tubes $\mathbf{27}^{1-n}$ which have been ignited are maintained by current through a resistance $\mathbf{29}^{1}$, which supplies a voltage a little higher than the extinguishing voltage of the discharge tubes $\mathbf{27}^{1-n}$.

During the third rotation, the discharge tubes of the second row, controlled by discharge tube $\mathbf{35}^{2}$ (not shown in the drawing) will be rendered operative, during the fourth rotation the third row of discharge tubes will be rendered operative, and so on, so that after, for example, ten rotations of the cathode ray distributor, all the required discharge tubes will have been rendered operative. The coordinated coils $\mathbf{3}^{1-n}$, $\mathbf{4}^{1-n}$ and so on will be energized to ensure that the respective printing levers $\mathbf{2}^{1-n}$ cordinated to these coils will not be effective to print.

In order to provide a substantial current pulse which is effective in the coils $\mathbf{3}^{1-n}$ and $\mathbf{4}^{1-n}$ the voltage of the positive pole, which, during the preparation phase described above, is only a little higher than the extinguishing voltage of the discharge tube is, shortly before the culmination point of the upward movement of shaft 5, changed over by switch 39 short circuiting resistor 40 to a higher voltage, just below the ignition voltage of *the* discharge tubes, the change occurring during a short interval beginning shortly before and ending shortly after the said culmination point. The switch 39 can be either a contact switch controlled by the mechanical movement of shaft 5, or it can be an electronic switch controlled by a discharge tube.

Instead of the changing of the voltage from a little higher than the extinguishing voltage to a little below the ignition voltage of the discharge tubes, discharge tubes with an additional electrode can be used. Such tubes would be ignited by the ignition electrode, maintained operative by the additional electrode during the preparation cycle and operated for a short interval by the control grid and main discharge circuit between the ordinary plate and the cathode. The main discharge circuit can then only be effective for the pre-ignited discharge tubes during the short interval at the respective movements when the printing levers are at their upper culminating points. The discharge tubes can either be provided with a heated cathode (thyratron) or with a cold cathode.

The multi-column printing units can be used also for teleprinting according to FIGS. 3*a* and 3*b*. In this case, the printing unit at the transmitting station is the same as described above. The intensity of the ray of the cathode ray distributor 41 is controlled by the pentode 42 which also applies the same pulses to the modulating stage of the transmitter 43. The pentode 44 transfers the synchronization frequency from the storage drum 15 or the storage tape 14 to the deflecting plate systems 45 and 46 over the phase shifting bridge 47, transferring the same frequency to the modulating stage of the transmitter 43. Both modulations are transmitted by the said transmitter.

The different sectors of the cathode ray distributor screen 48 effect the selective ignition of the multi-denomination tubes $49^{1-n}$ controlling the multi-denomination printing unit 50 with its coils $3^{1-n}$, $4^{1-n}$ (see FIG. 1) via the plug board 51. In this case, the discharge tubes $49^{1-n}$ are shown as tubes with cold cathodes. The up and down movement of the main shaft 5 (see FIG. 1), with the several printing levers, is controlled again by the cathode ray distributor 41 by means of the discharge tube 52. The extinguishing of the discharge tube 52 is effected by breaking the circuit by means of a contact 53 controlled mechanically by the moving ends of the main shaft 5.

At the receiving station a similar arrangement exists. The transfer is effected dot line per dot line via receiver 54 (FIG. 3*b*), the cathode ray distributor 55 and the printing unit 50. The transmitted or received pulses are conducted from the receiver to the filters 56 and 57 of which the filter 57 passes lower frequencies, such as the synchronizing frequencies, whereas the filter 56 passes higher frequencies, such as the pulses representing the characters to be printed.

The lower frequency passed by the filter 57 is amplified in a pentode 58 controlling, after the amplification, the deflection plate system 59 and 60, the voltages being chosen in such a way that the voltages at deflecting plate system 59 are phase-shifted by 90 degrees compared with the voltage controlling the deflecting system 60. The amplification of the pulses by pentode 61 controls the intensity of the cathode ray in the cathode ray tube 55 according to whether or not, at the moment concerned the control electrode 62 becomes less negative than its bias. As the rotation of the cathode ray in the cathode ray distributor 41 at the transmitting station is effected by the same control frequency as controls the rotation of the cathode ray in the distributor 55, the cathode ray of the cathode ray distributor screen 48 passes at every momento of the cycle the sector in distributor 46 corresponding to the sector passed over by the cathode ray of the cathode ray distributor 55. This single control frequency can be taken from a storage drum or a storage tape or from a synchronizing generator, which may produce the two alternating currents, the voltages of which are relatively shifted by 90 degrees by an off-set arrangement of their windings. The printing can likewise be effective by the multi-column unit 50 via the ignition of the control discharge tubes $49^{1-n}$ which are connected to the different sectors of the cathode ray distributor screen 63.

The movement of the main shaft, corresponding to main shaft 5 of FIG. 1, is controlled by an arrangement similar to magnetic systems 7 and 8 of FIG. 1.

Any suitable data synchronizing system may be utilized to control the printing levers or the like instead of the combination of the cathode ray distributor and discharge tubes or the like. A suitable synchronizing system will operate with great accuracy although long distances may be involved.

The pulses controlling the movement of the main shaft of the printing unit can be used also as synchronization pulses for the sawtooth control of a discharge circuit, to the capacitor of which the horizontal deflecting plates of a cathode ray tube are connected in parallel. If in this case the cathode ray tube has the ordinary luminescent screen and the pulses amplified via pentode 61 are applied to the control electrode of the cathode ray tube 55, the printing dot lines can be made visible on the screen of the cathode ray tube due to the fact that within every horizontal line the intensity of the cathode ray will be controlled in accordance with the transmitted type character pulses.

By means of the plug board 51 the arrangements of the type character rows on the paper sheet can be chosen simply by corresponding connections between coils $3^{1-n}$ and discharge tubes $49^{1-n}$.

The type character coding device, coding the type character symbol pulses into printable or visible type character pulse sequences is described in my copending patent application Ser. No. 498,055, filed Mar. 30, 1955 now U.S. Patent No. 2,928,951.

What I claim is:

1. Control and operating means for printing, indicating and other representation of data, comprising
   input means producing control signals in a timewise serial order;
   storage means including a first group of conductors, a second group of conductors, a plurality of storage elements each having an energized stable storage condition and an unenergized stable storage condition and each coupled to a conductor of said first group of conductors and coupled to a conductor of said second group of conductors;
   energizing means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronic switching means having a plurality of selecting elements each connected to a corresponding one of the conductors of said second group of conductors and second selecting means operated in dependence upon said control signals to condition said second selecting elements for operation at determined times, said second electronic switching means being adapted to energize selected conductors of said second group of conductors;
   each of said storage elements being energized to its energized stable storage condition upon energization of both the conductor of said first group of conductors to which said storage element is coupled and the conductor of said second group of conductors to which said storage element is coupled;
   output means including a plurality of output elements coordinated to said storage elements; and actuating means, cooperating with said elements, making output elements selectively operative in a timewise parallel order and in dependence upon the condition of energization of said coordinated storage elements.

2. Control and operating means for printing, indicating and other representation of data, comprising input means producing control signals in a timewise serial order;

storage means including a first group of conductors, a second group of conductors, a plurality of storage elements each having an energized stable storage condition and an unenergized stable storage condition and each coupled to a conductor of said first group of conductors and coupled to a conductor of said second group of conductors;

energizing means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronic switching means having a plurality of selecting elements each connected to a corresponding one of the conductors of said second group of conductors and second selecting means operated in dependence upon said control signals to condition said second selecting elements for operation at determined times, said second electronic switching means being adapted to energize selected conductors of said second group of conductors;

each of said storage elements being energized to its energized stable storage condition upon energization of both the conductor of said first group of conductors to which said storage element is coupled and the conductor of said second group of conductors to which said storage element is coupled;

output means including a plurality of output elements coordinated to said storage elements;

actuating means, cooperating with said elements, making output elements selectively operative in a timewise parallel order and in dependence upon the condition of energization of said coordinated storage elements, said selective switching means selectively connected between selected ones of said storage elements and selected ones of said output elements of said output means for a selective coordination between said storage elements and said output elements.

3. Control and operating means for printing, indicating and other representation of data in dots, lines, combination of dots and lines and similar representation; comprising input means for producing control signals in a timewise serial order for a row of dots,.for a row of lines, for combinations of dots and lines and similar representations;

storage means including a first group of conductors, a second group of conductors, a plurality of storage elements each having an energized stable storage condition and an unenergized stable storage condition and each coupled to a conductor of said first group of conductors and coupled to a conductor of said second group of conductors;

energizing means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronic switching means having a plurality of selecting elements each connected to a corresponding one of the conductors of said second group of conductors and second selecting means operating in depending upon said control signals to condition said second selecting elements for operation at determined times, said second electronic switching means being adapted to energize selected conductors of said second group of conductors;

each of said storage elements being energized to its energized stable storage condition upon energization of both the conductor of said first group of conductors to which said storage element is coupled and the conductor of said second group of conductors to which said storage element is coupled;

output means including a plurality of output elements coordinated to said storage elements; and actuating means, cooperating with said elements, making output elements selectively operative in a timewise parallel order and in dependence upon the condition of energization of said coordinated storage elements.

4. Control and operating means for teleprinting, teleindicating and other telerepresentation of data in a plurality of parallel printing, indicating the other representation positions, comprising transmitting means;

receiving means;

signal transmitting means between said transmitting means and said receiving means;

input means at said transmitting means producing control signals in a timewise serial order;

storage means at said receiving means including a first group of conductors, a second group of conductors, a plurality of storage elements each having an energized stable storage condition and an unenergized stable storage condition and each coupled to a conductor of said first group of conductors and coupled to a conductor of said second group of conductors;

energizing means at said receiving means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronic switching means having a plurality of selecting elements each connected to a corresponding one of the conductors of said second group of conductors and second selecting means operated in dependence upon said control signals to condition said second selecting elements for operation at determined times, said second electronic switching means being adapted to energize selected conductors of said second group of conductors;

each of said storage elements being energized to its energized stable storage condition upon energization of both the conductor of said first group of conductors to which said storage element is coupled and the conductor of said second group of conductors to which said storage element is coupled;

output means including a plurality of output elements coordinated to said storage elements; and actuating means, cooperating with said elements, making output elements selectively operative in a timewise parallel order and in dependence upon the condition of energization of said coordinated storage elements.

5. Control and operating means for teleprinting, teleindicating and other telerepresentation of data in a plurality of parallel printing, indicating and other representation positions, comprising transmitting means;

receiving means;

signal transmitting means between said transmitting means and said receiving means;

input means at said transmitting means producing control signals in a timewise serial order;

storage means at said receiving means including a first group of conductors, a second group of conductors, a plurality of storage elements each having an energized stable storage condition and an unenergized stable storage condition and each coupled to a conductor of said first group of conductors and coupled to a conductor of said second group of conductors;

frequency separating means at said receiving means for distinguishing between different frequencies of signals transmitted via said signal transmitting means from the input means of said transmitting means to the storage means of said receiving means;

energizing means at said receiving means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronic switching means having a plurality of selecting elements each connected to a corresponding one of the conductors of said second group of conductors and second selecting means operated in dependence upon said control signals to condition said second selecting elements for operation at determined times, said second electronic switching means being adapted to energize selected conductors of said second group of conductors;

each of said storage elements being energized to its energized stable storage condition upon energization of both the conductor of said first group of conductors to which said storage element is coupled and the conductor of said second group of conductors to which said storage element is coupled;

output means including a plurality of output elements coordinated to said storage elements; and actuating means, cooperating with said elements, making output elements selectively operative in a timewise parallel order and in dependence upon the condition of energization of said coordinated storage elements.

6. Control and operating means for teleprinting, teleindicating and other telerepresentation of data in a plurality of parallel printing, indicating and other representation positions, comprising transmitting means;

receiving means;

wireless means for signal transmission between said transmitting means and said receiving means;

input means at said transmitting means producing control signals in a timewise serial order;

storage means at said receiving means including a first group of conductors, a second group of conductors, a plurality of storage elements each having an energized stable storage condition and an unenergized stable storage condition and each coupled to a conductor of said first group of conductors and coupled to a conductor of said second group of conductors;

energizing means at said receiving means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronic switching means having a plurality of selecting elements each connected to a corresponding one of the conductors of said second group of conductors and second selecting means operated in dependence upon said control signals to condition said second selecting elements for operation at determined times, said second electronic switching means being adapted to energize selected conductors of said second group of conductors;

each of said storage elements being energized to its energized stable storage condition upon energization of both the conductor of said first group of conductors to which said storage element is coupled and the conductor of said second group of conductors to which said storage elements is coupled;

output means including a plurality of output elements coordinated to sai dstorage elements; and actuating means, cooperating with said elements, making output elements selectively operative in a timewise parallel order and in dependence upon the condition of energization of said coordinated storage elements.

7. Control and operating means for teleprinting, teleindicating and other representation positions, comprising transmitting means;

receiving means;

wireless means for signal transmission between said transmitting means and said receiving means;

input means at said transmitting means producing control signals in a timewise serial order;

storage means at said receiving means including a first group of conductors, a second group of conductors, a plurality of storage elements each having an energized stable storage condition and an unenergized stable storage condition and each coupled to a conductor of said first group of conductors and coupled to a conductor of said second group of conductors;

frequency separating means at said receiving means for distinguishing between different frequencies of signals transmitted via said signal transmitting means from the input means of said transmitting means to the storage means of said receiving means;

energizing means at said receiving means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronic switching means having a plurality of selecting elements each connected to a corresponding one of the conductors of said second group of conductors and second selecting means operated in dependence upon said control signals to condition said second selecting elements for operation at determined times, said second electronic switching means being adapted to energize selected conductors of said second group of conductors;

each of said storage elements being energized to its energized stable storage condition upon energization of both the conductor of said first group of conductors to which said storage element is coupled and the conductor of said second group of conductors to which said storage element is coupled;

output means including a plurality of output elements coordinated to said storage elements; and actuating means, cooperating with said elements, making output elements selectively operative in a timewise parallel order and in dependence upon the condition of energization of said coordinated storage elements.

8. Control and operating means for printing, indicating and other representation of data in dots, lines, combination of dots and lines and similar representation; comprising transmitting means;

receiving means;

signal transmitting means between said transmitting means and said receiving means;

input means for producing control signals in a timewise serial order for a row of dots, for a row of lines, for combinations of dots and lines and similar representations;

storage means at said receiving means including a first group of conductors, a second group of conductors, a plurality of storage elements each having an energized stable storage condition and an unenergized stable storage condition and each coupled to a conductor of said first group of conductors and coupled to a conductor of said second group of conductors;

frequency separating means at said receiving means for distinguishing between different frequencies of signals transmitted via said signal transmitting means from the input means of said transmitting means to the storage means of said receiving means;

energizing means as said receiving means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors and second electronic switching means having a plurality of selecting elements each connected to a corresponding one of the conductors of said second group of conductors and second selecting means operated in dependence upon said control signals to condition said second selecting elements for operation at determined times, said second electronic switching means being adapted to energize selected conductors of said second group of conductors;

each of said storage elements being energized to its energized stable storage condition upon energization of both the conductor of said first group of conductors to which said storage element is coupled and the conductor of said second group of conductors to which said storage element is coupled;

output means including a plurality of output elements coordinated to said storage elements; and actuating means, cooperating with said elements, making output elements selectively operative in a timewise parallel order and in dependence upon the condition of energization of said coordinated storage elements.

9. Control and operating means for printing, indicating and other representation of data in dots, lines, combination of dots and lines and similar representation; comprising transmitting means;

receiving means;

wireless means for signal transmission between said transmitting means and said receiving means;

input means for producing control signals in a timewise serial order for a row of dots, for a row of lines, for combinations of dots and lines and similar representations;

storage means at said receiving means including a first group of conductors, a second group of conductors, a plurality of storage elements each having an energized stable storage condition and an unenergized stable storage condition and each coupled to a conductor of said first group of conductors and coupled to a conductor of said second group of conductors;

energizing means at said receiving means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronic switching means having a plurality of selecting elements each connected to a corresponding one of the conductors of said second group of conductors and second selecting means operated in dependence upon said control signals to condition said second selecting elements for operation at determined times, said second electronic switching means being adapted to energize selected conductors of said second group of conductors;

each of said storage elements being energized to its energized stable storage condition upon energization of both the conductor of said first group of conductors in which said storage element is coupled and the conductor of said second group of conductors to which said storage element is coupled;

output means including a plurality of output elements coordinated to said storage elements; and actuating means, cooperating with said elements, making output elements selectively operative in a timewise parallel order and in dependence upon the condition of energization of said coordinated storage elements.

10. Control and operating means for printing, indicating and other representation of data in dots, lines, combination of dots and lines and similar representation; comprising transmitting means receiving means;

wireless means for signal transmission between said transmitting means and said receiving means;

input means for producing control signals in a timewise serial order for a row of dots, for a row of lines; for combinations of dots and lines and similar representations storage means at said receiving means including a first group of conductors, a second group of conductors, a plurality of storage elements each having an energized stable storage condition and an unenergized stable storage condition and each coupled to a conductor of said first group of conductors and coupled to a conductor of said second group of conductors;

frequency separating means at said receiving means for distinguishing between different frequencies of signals transmitted via said signal transmitting means from the input means of said transmitting means to the storage means of said receiving means;

energizing means at said receiving means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronic switching means having a plurality of selecting elements each connected to a corresponding one of the conductors of said second group of conductors and second selecting means operated in dependence upon said control signals to condition said second selecting elements for operation at determined times, said second electronic switching means being adapted to energize selected conductors of said second group of conductors;

each of said storage elements being energized to its energized stable storage condition upon energization of both the conductor of said first group of conductors to which said storage element is coupled and the conductor of said second group of conductors to which said storage element is coupled;

output means including a plurality of output elements coordinated to said storage elements; and actuating means, cooperating with said elements, making output elements selectively operative in a timewise parallel order and in dependence upon the condition of energization of said coordinated storage elements.

11. Control and operating means for teleprinting teleindicating and other telerepresentation of data, comprising transmitting means;

receiving means;

signal transmitting means between said transmitting means and said receiving means;

computing means including magnetic data storage means at said transmitting means producing control signals in a timewise serial order;

storage means at said receiving means including a first group of conductors, a second group of conductors, a plurality of storage elements each having an energized stable storage condition and an unenergized stable storage condition and each coupled to a conductor of said first group of conductors and coupled to a conductor of said second group of conductors;

energizing means at said receiving means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronics switching means having a plurality of selecting elements each connected to a corresponding one of the conductors of said group of conductors and second selecting means operated in dependence upon said control signals to condition said selecting elements for operation at determined times, said second electronic switching means being adapted to energize selected conductors of said second group of conductors;

each of said storage elements being energized to its energized stable storage condition upon energization of both the conductor of said first group of conductors to which said storage element is coupled and the conductor of said second group of conductors to which said storage element is coupled;

output means including a plurality of output elements coordinated to said storage elements; and actuating means, cooperating with said elements, making output elements selectively operative in a timewise parallel order and in dependence upon the condition of energization of said coordinated storage elements.

12. Control and operating means for printing, indicating and other representation of data in dots, lines, combination of dots and lines and similar representation; comprising transmitting means;

receiving means;

signal transmitting means between said transmitting means and said receiving means;

magnetic data storage means at said transmitting means producing control signals in serial order for a row of dots, for a row of lines, for combinations of dots and lines and similar representations;

storage means including a first group of conductors, a second group of conductors, a plurality of storage elements each having an energized stable storage condition and an unenergized stable storage condition and each coupled to a conductor of said first group of conductors and coupled to a conductor of said second group of conductors;

energizing means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronic switching means having a plurality of selecting elements each connected to a corresponding one of the conductors of said second group of conductors and second selecting means operated in dependence upon said control signals to condition said second selecting elements for operation at determined times, said second electronic switching means being adapted to energize selected conductors of said second group of conductors;

each of said storage elements being energized to its energized stable storage condition upon energization of both the conductor of said first group of conductors to which said storage element is coupled and the conductor of said second group of conductors to which said storage element is coupled;

output means including a plurality of output elements coordinated to said storage elements; and actuating means, cooperating with said elements, making output elements selectively operative in a timewise parallel order and in dependence upon the condition of energization of said coordinated storage elements

13. Control and operating means for teleprinting, teleindicating and other telerepresentation of data, comprising transmitting means;

receiving means;

signal transmitting means between said transmitting means and said receiving means;

computer means including magnetic data storage means at said transmitting means producing control signals in a timewise serial order;

storage means at said receiving means including a first group of conductors, a second group of conductors, a plurality of storage elements each having an energized stable storage condition and an unenergized stable storage condition and each coupled to a conductor of said first group of conductors and coupled to a conductor of said second group of conductors;

frequency separating means at said receiving means for distinguishing between different frequencies of signals transmitted via said signal transmitting means from the input means of said transmitting means to the storage means of said receiving means;

energizing means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronic switching means having a plurality of selecting elements each connected to a corresponding one of the conductors of said second group of conductors and second selecting means operated in dependence upon said control signals to condition said second selecting elements for operation at determined times, said second electronic switching means being adapted to energize selected conductors of said second group of conductors;

each of said storage elements being energized to its energized stable storage condition upon energization of both the conductor of said first group of conductors to which said storage element is coupled and the conductor of said second group of conductors to which said storage element is coupled;

output means including a plurality of output elements coordinated to said storage elements; and actuating means, cooperating with said elements, making output elements selectively operative in a timewise parallel order and in dependence upon the condition of energization of said coordinated storage elements.

14. Control and operating means for printing, indicating and other representation of data in dots, lines, combination of dots and lines and similar representation, comprising transmitting means;

receiving means;

signal transmitting means between said transmitting means and said receiving means;

magnetic data storage means at said transmitting means producing control signals in a timewise serial order for a row of dots, for a row of lines, for combinations of dots and lines and similar representations;

storage means including a first group of conductors, a second group of conductors, a plurality of storage elements each having an energized stable storage condition and an unenergized stable storage condition and each coupled to a conductor of said first group of conductors and coupled to a conductor of said second group of conductors;

frequency separating means at said receiving means for distinguishing between different frequencies of signals transmitted via said signal transmitting means from the input means of said transmitting means to the storage means of said receiving means;

energizing means including first electronic switching means having a plurality of selecting elements each connected to a corresponding one of the conductors of said first group of conductors and first selecting means operated in dependence upon said control signals to condition said first selecting elements for operation at determined times, said first electronic switching means being adapted to energize selected conductors of said first group of conductors, and second electronic switching means having a plurality of selecting elements each connected to a corresponding one of the conductors of said second group of conductors and second selecting means operated in dependence upon said control signals to condition said second selecting elements for operation at determined times, said second electronic switching means being adapted to energize selected conductors of said second group of conductors;

each of said storage elements being energized to its energized stable storage condition upon energization of both the conductor of said first group of conductors to which said storage element is coupled and the conductor of said second group of conductors to which said storage element is coupled output means including a plurality of output elements coordinated to said storage elements; and actuating means, cooperating with said elements, making output elements selectively operative in a timewise parallel order and in dependence upon the condition of energization of said coordinated storage elements.

No references cited.

THOMAS A. ROBINSON, *Primary Examiner.*

U.S. Cl. X.R.

178—3, 15